F. J. MOSER.
DEVICE FOR ATTACHING REELS TO ENGINES.
APPLICATION FILED JULY 28, 1911.
1,053,205.
Patented Feb. 18, 1913.
2 SHEETS—SHEET 1.
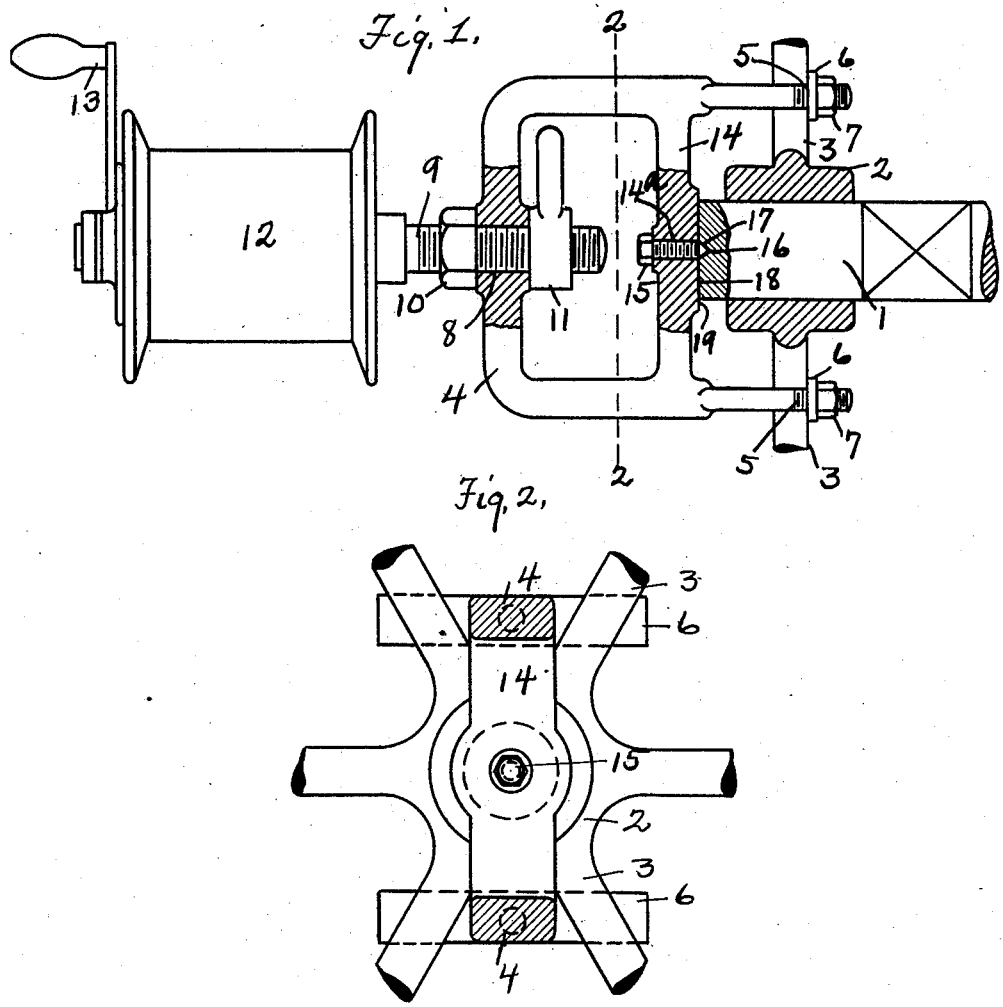

F. J. MOSER.
DEVICE FOR ATTACHING REELS TO ENGINES.
APPLICATION FILED JULY 28, 1911.
1,053,205.
Patented Feb. 18, 1913.
2 SHEETS—SHEET 2.
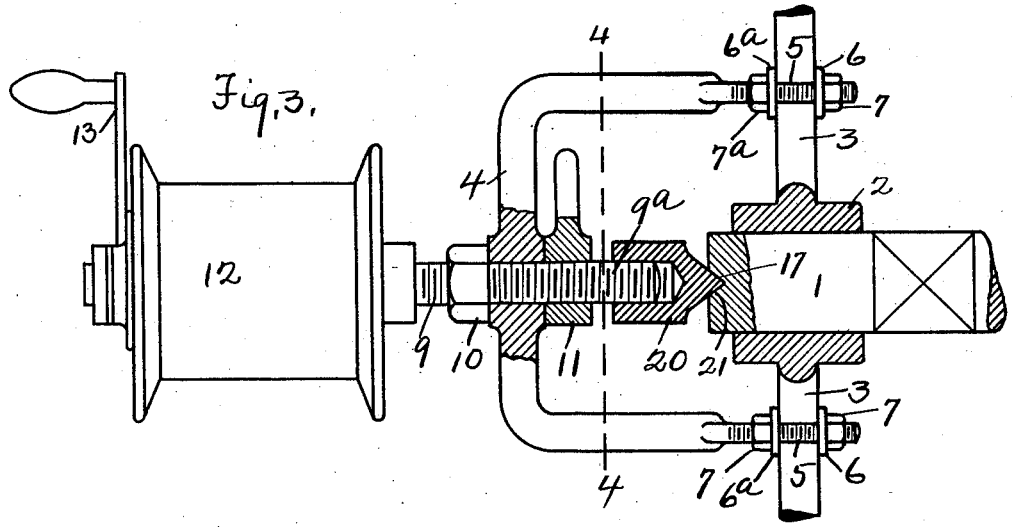
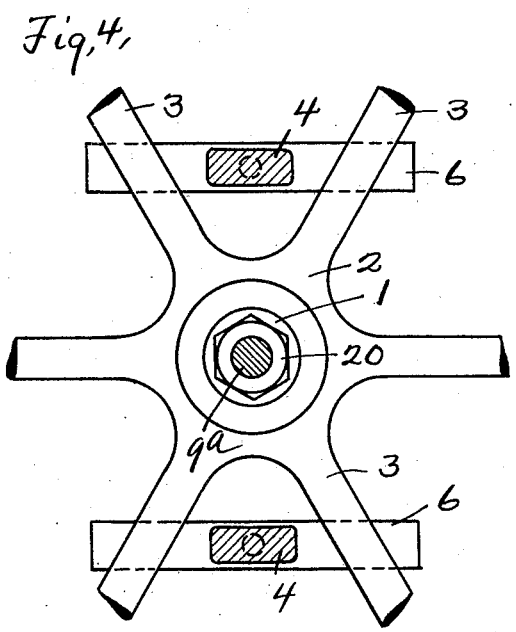
Witnesses
B. M. Hartman
Vinnie C. Hess
Inventor
Fred J. Moser
by
Attorney

UNITED STATES PATENT OFFICE.

FRED JOSEPH MOSER, OF KANE, PENNSYLVANIA, ASSIGNOR TO MOSER MANUFACTURING COMPANY, OF KANE, PENNSYLVANIA, A CORPORATION OF PENNSYLVANIA.

DEVICE FOR ATTACHING REELS TO ENGINES.

1,053,205.   Specification of Letters Patent.   Patented Feb. 18, 1913.

Application filed July 28, 1911. Serial No. 640,997.

*To all whom it may concern:*

Be it known that I, FRED J. MOSER, a citizen of the United States, residing at Kane, in the county of McKean and State of Pennsylvania, have invented new and useful Improvements in Devices for Attaching Reels to Engines, of which the following is a specification.

This invention relates to devices for attaching reels to engines and consists in certain improvements in the construction thereof as will be hereinafter fully described and pointed out in the claims.

In operating reels with oil wells it is often desirable to attach the reel to the engine to operate it and to use the reel so attached for winding measuring lines or torpedo lines from the well. With the ordinary devices for securing the reel to the engine, difficulty has been experienced in centering the reel with the engine shaft, and where this was not accomplished there has been such wabbling of the reel as to tend to throw the line off the reel.

The object of the present invention is to so arrange the attaching device that the reel may be readily centered and alined with the axis of the shaft.

The invention is illustrated in the accompanying drawings as follows: Figure 1 shows a side elevation partly in section of an attaching device and reel in place. Fig. 2 a section on the line 2—2 in Fig. 1. Fig. 3 a view similar to Fig. 1 of an alternative construction. Fig. 4 a section on the line 4—4 in Fig. 3.

1 marks the engine shaft, 2 the hub of a wheel on the shaft, and 3 the spokes extending from the hub.

The attaching device is in the form of a yoke having the screw threaded ends 5 projecting in an axial direction along the shaft. The ends 5 extend through the plates 6, and a nut 7 is arranged on the screw threaded ends 5. The plates 6 extend from one spoke to another forming a clamping support. The outer end of the yoke has a perforation 8 through which the shaft 9 of the reel extends. The shaft is preferably screw threaded and has the nut 10 on the outer side and the lever nut 11 on the inner side by means of which the reel shaft may be readily clamped to the yoke. The spool of the reel 12 is arranged on the shaft and there is provided a crank 13, these parts being of any construction but preferably of the construction shown in my Patent #964,116, dated July 12, 1910. A cross bar 14 extends from one arm of the yoke to the other. It has the screw threaded perforation 14$^a$ through which a set screw 15 extends. The set screw has the conical ends 16 which extend into a detent 17 in the end of the shaft, the detent being in the center of the shaft and forming, therefore, a centering surface. The end of the shaft 18 has a surface at right angles to the axis of the shaft, and the cross bar 14 has a surface at right angles to the perforation 8 in the yoke. The center of the perforation 8 is in axial alinement with the engine shaft 1 when the point 16 is arranged in the detent 17 and the surface 19 is brought into contact with the surface 18. In this way, the reel attaching device is not only centered with the shaft but is also brought into axial alinement.

In the alternative construction shown in Figs. 3 and 4 the cross bar 14 is omitted. The ends of the yoke extend through a strap or plate 6$^a$, and a nut 7$^a$ is provided on the screw threaded end so that the strap or plate 6$^a$ may be clamped on the spokes 3 and the yoke clamped in place on the plate. The reel shaft 9 has a screw threaded extension 9$^a$. A nut 20 is arranged on the end of the screw threaded extension 9$^a$ and is provided with a cone shaped point 21 which is adapted to engage the centering detent 17 in the end of the shaft. This alternative construction will center the shaft 9, but is not as efficient as that shown in Fig. 1 in that it does not also aline it because of the absence of contact between surfaces such as 18 and 19.

What I claim as new is:

1. In a device for attaching reels to engines having an engine shaft with a centering surface therein, the combination of a yoke having ends projecting in an axial direction; a member mounted on the shaft and rotating therewith; means for securing the ends of the yoke to the member; a reel shaft secured to the yoke; a reel on the reel shaft; and devices carried by the yoke and adapted to act on the centering surface for centering the yoke with the shaft.

2. In a device for attaching reels to engines having an engine shaft with a centering surface therein and a member containing spokes thereon and rotatable therewith, the combination of a yoke having ends projecting in an axial direction and adapted to extend to the spokes of the member on the shaft; means for securing the projecting ends; a reel shaft secured to the yoke; a reel on the reel shaft; and devices carried by the yoke and adapted to act on the centering surface for centering the yoke with the shaft.

3. In a device for attaching reels to engines having an engine shaft with surfaces at right angles to the axis of the shaft, a yoke having projecting ends extending in an axial direction; a surface on the yoke for contacting the surface on the shaft; a member mounted on the shaft and rotating therewith; means for attaching the ends of the yoke to the said member; a reel shaft carried by the yoke; a reel on the reel shaft; and a centering screw carried by the yoke and acting on the shaft for centering the yoke.

4. In a device for attaching reels to engines having an engine shaft with a centering surface therein, the combination of a yoke having ends projecting in an axial direction; a cross bar with an alining surface thereon adapted to contact the end of the engine shaft; a screw arranged in the cross bar and adapted to engage the centering surface on the shaft; a reel shaft secured to the yoke; and a reel on the shaft.

In testimony whereof I have hereunto set my hand in the presence of two subscribing witnesses.

FRED JOSEPH MOSER.

Witnesses:
W. H. BUNCE,
JOSEPHINE ROCHE.

---

Copies of this patent may be obtained for five cents each, by addressing the "Commissioner of Patents, Washington, D. C."